(12) United States Patent
Kennedy

(10) Patent No.: US 7,524,387 B2
(45) Date of Patent: Apr. 28, 2009

(54) METHOD OF REINFORCING AN EXISTING METAL STRUCTURE, METHOD OF REINFORCING PIPES AND METHOD OF ADDITION OR SPUR LINES TO PIPELINES

(75) Inventor: Stephen J. Kennedy, Ontario (CA)

(73) Assignee: Intelligent Engineering ( Bahamas ) Limited, Nassau (BS)

( * ) Notice: Subject to any disclaimer, the term of this patent is extended or adjusted under 35 U.S.C. 154(b) by 127 days.

(21) Appl. No.: 10/385,008

(22) Filed: Mar. 10, 2003

(65) Prior Publication Data

US 2003/0230375 A1    Dec. 18, 2003

(51) Int. Cl.
*B29C 73/00*     (2006.01)
*F16L 55/18*     (2006.01)

(52) U.S. Cl. .............. 156/94; 138/97; 138/98; 138/99; 114/360; 114/361; 285/294.1

(58) Field of Classification Search ............ 52/450, 52/309.7, 432, 3, 416, 649.2, 583, 407, 251; 156/94, 306; 285/295, 294.1; 138/97–99; 114/65 R, 74 A, 360, 361

See application file for complete search history.

(56) References Cited

U.S. PATENT DOCUMENTS

| | | | | |
|---|---|---|---|---|
| 2,069,722 A | * | 2/1937 | Merrill | 138/99 |
| 3,907,049 A | | 9/1975 | Baffas | |
| 3,935,632 A | * | 2/1976 | Maxson | 29/455.1 |
| 4,011,652 A | * | 3/1977 | Black | 29/455.1 |
| 4,133,158 A | * | 1/1979 | Ting | 52/478 |
| 4,987,036 A | * | 1/1991 | Miller | 428/626 |
| 5,079,824 A | * | 1/1992 | Lopez et al. | 29/402.13 |
| 5,125,691 A | | 6/1992 | Bogdon | |
| 5,778,813 A | | 7/1998 | Kennedy | |
| 5,842,496 A | | 12/1998 | Delanty et al. | |
| 5,924,743 A | | 7/1999 | Bonmartin et al. | |
| 6,036,235 A | | 3/2000 | Anderson et al. | |
| 6,050,208 A | * | 4/2000 | Kennedy | 114/74 A |

FOREIGN PATENT DOCUMENTS

| | | |
|---|---|---|
| FR | 2 329 925 A1 | 5/1977 |
| GB | 2 337 022 A1 | 11/1999 |
| SU | 1011440 | 4/1983 |

OTHER PUBLICATIONS

Official Action dated Apr. 2005 for Application No. 2003109748/28(010983), Filed Aug. 21, 2001.
B.Y. Telianer, "Method of ships' Reparining"mL, Sudostroenie, 1984, pp. 270-273, fig. 144r, 146.
V.g. Fadeev, "Naval Dictionary", Voenisdat MO, USSR,M., 1959, vol. 2, p. 409.

* cited by examiner

*Primary Examiner*—Justin Fischer
(74) *Attorney, Agent, or Firm*—Darby & Darby

(57) ABSTRACT

A method of reinforcing a metal panel or pipe of an existing structure comprising the steps of attaching a reinforcing metal layer to said metal panel or pipe in spaced apart relation to thereby form at least one cavity between inner surfaces of said metal panel and said reinforcing metal layer, injecting an intermediate layer comprised of an uncured plastics material into said at least one cavity, and curing said plastics material so that it adheres to said inner surfaces of said metal panel or pipe and said reinforcing metal layer.

28 Claims, 6 Drawing Sheets

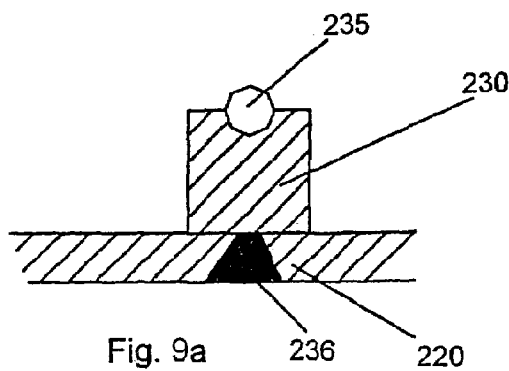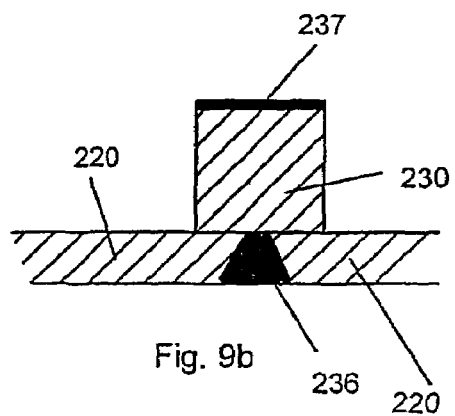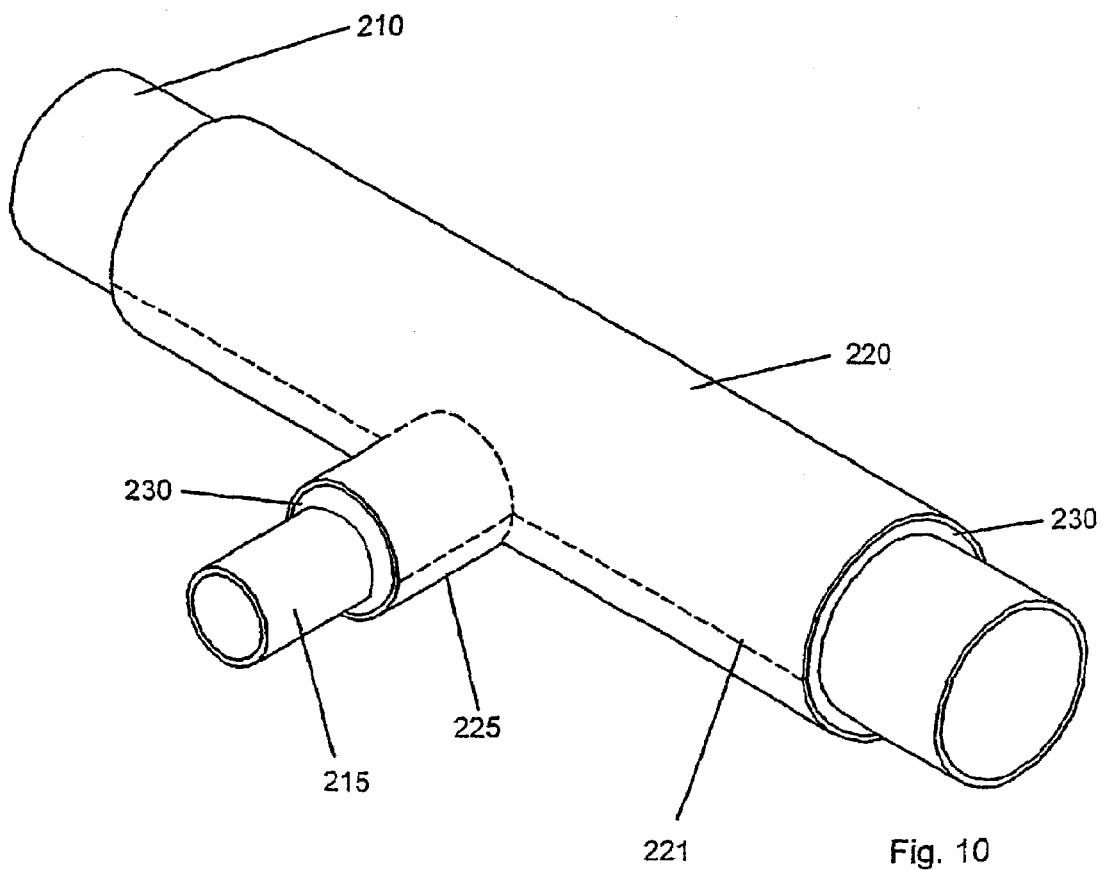

METHOD OF REINFORCING AN EXISTING METAL STRUCTURE, METHOD OF REINFORCING PIPES AND METHOD OF ADDITION OR SPUR LINES TO PIPELINES

The present invention relates to a method of reinforcing and/or reinstating and/or rehabilitating an existing metal structure, particularly existing metal panels of larger existing structures. More particularly, the method relates to reinforcing and/or reinstating metal panels which have been reduced in thickness by corrosion and/or wear in service and which must therefore be replaced or strengthened. The present invention also relates to reinforcing pipelines and to adding spur lines to existing pipelines.

Metal panels used for deck plates of Ro-Ro (or Ro-Pax) ferries experience corrosion and wear rates in the range of 0.1 to 0.3 mm per year with typical rates of 0.15 mm per year. According to the rules and regulations of classification societies such as Lloyd's Register, the plates must be replaced when the original thickness is reduced by 30% because then the mechanical properties are significantly decreased. Plate replacement requirements and the corresponding reduced plate thickness expressed as a function of the original plate thickness for typical ships sections and structural elements are specified in Lloyd's Register technical document entitled "Thickness Measurement and Close-up Survey of Ships in Accordance with Lloyd's Register Rules and Regulations for the Classification of Ships—Revision 2, January 1997". The elastic section modulus and moment of inertia reductions cause stresses and deflections of more than a critical amount. Plates in other portions of the ship must also be replaced when their reduced thickness reaches values specified by the classification societies.

Current practice requires the deck plate to be removed and replaced to thereby extend the life of the ship. This prior art method requires extensive work and can involve: the replacement of primary stiffening; the detachment of piping and cables; the removal of fire insulation material, etc. from the underside of the deck panels; scaffolding and extensive welding. It is generally very expensive, time consuming and may even introduce fatigue prone flaws in the welds as these welds are difficult to make in situ.

An aim of the invention is to provide a method of structurally reinforcing or reinstating stiffened metal plates without the need to remove the stiffening members and other detailing.

Pipelines for the transport of, for example, gas or oil also suffer from the same problems as metal panels used for deck plates of ferries in that they experience corrosion and as a result reduced structural strength and integrity. At present pipelines are repaired by welding steel casings directly to the existing pipes risking burning through the pipes and a resulting explosion. This method of reinforcing pipes is considered dangerous and requires quality field welds. Although expensive, this method of repair is the most economical for rehabilitating sections of in-service pipelines that cannot be taken out of service. Building parallel replacement pipelines is not considered economically feasible.

An aim of the invention is to provide a method of reinforcing or rehabilitating pipes that have deteriorated from corrosion without the need of welding directly to the existing pipeline.

The present invention provides a method of reinforcing an existing metal structure comprising the steps of:

attaching a reinforcing metal layer to said metal panel in spaced apart relation to thereby form at least one cavity between inner surfaces of said metal panel and said reinforcing metal layer;

injecting an intermediate layer comprised of an uncured plastics material into said at least one cavity; and curing said plastics material so that it adheres to said inner surfaces of said metal panel and said reinforcing metal layer.

The method described below advantageously allows a metal panel of an existing structure which has come to the end of its useful life to be reinforced without removal and with little preparation. This results in less off-line time for the structure during reinstatement. The resulting reinforced structure is only marginally more heavy than a new metal panel replacing the old panel. This method allows for the reinstatement of hulls without the need to dry dock. The reinforcement provides inherent damping and sound insulation. The plastics material may be self-curing and simply allowed to cure, or e.g. heat curing and heated to cure it.

The method described below also advantageously allows an existing main pipeline to be reinforced and/or rehabilitated, or to be modified (the addition of spur lines) without the need to weld directly to the existing main pipeline. This reduces the risk of burn-through, gas release and explosion thereby dramatically increasing the safety for the persons making the modifications. A direct consequence of this process of repair is to simplify the weld procedures and reduce the risk and cost of the procedures.

As well as repairing or reinstating or rehabilitating a metal panel or pipeline to original strength, the present invention can of course be applied to any existing structure, whether old or new, to improve, protect or strengthen it as desired.

Currently the addition of spur pipelines for operating pipelines is generally considered to be a difficult and dangerous process and requires special weld procedures to attach the spur pipeline. Usually the spur line is first welded directly to the main pipeline and then the main pipeline inside of the spur pipeline is bored away through special pipe and valve fixtures attached to the spur pipeline.

An aim of the invention is to provide a method of attaching a spur pipeline to an existing pipeline in a more simple and reliable way than at present. Ideally the strength of the joint between the main pipeline and the spur pipeline, the integrity thereof and the safety for making the connection is also improved.

The present invention provides a method of adding a spur pipeline to an existing main pipeline comprising the steps of:

providing a first metal layer around said main pipeline in spaced apart relation thereby to form a sealed cavity between an inner surface of said metal layer and an outer surface of said main pipeline;

providing a spur pipeline such that the bore of said spur pipeline is substantially perpendicular to the longitudinal axis of said main pipeline and in communication with said outer surface of said main pipeline and sealed from said first cavity;

providing a second metal layer around said spur pipeline in spaced apart relation thereby to form a second cavity between an inner surface of said second metal layer and an outer surface of said spur pipeline;

injecting an intermediate layer comprised of an uncured plastics material into said cavities;

curing said plastics material so that it adheres to said surfaces of said metal layer, main pipeline and spur pipeline; and removing that part of said existing main pipeline which is in communication with said bore of said spur pipeline thereby to connect said bore of said spur pipeline with the bore of said main pipeline.

The method described below results in a strong connection between the spur line and the pipeline which can be manufactured in a safe manner.

The structure resulting from use of the present invention is similar to those described in U.S. Pat. No. 5,778,813, British Patent Application GB-A-2 337 022 and British Patent Application No. 9926333.7. The materials and techniques disclosed in those documents can be made use of in practice of the present invention and structures constructed according to the present invention can enjoy the benefits and advantages described therein.

The invention will now be described by way of example only with reference to the accompanying drawings, in which.

Figure 7A:
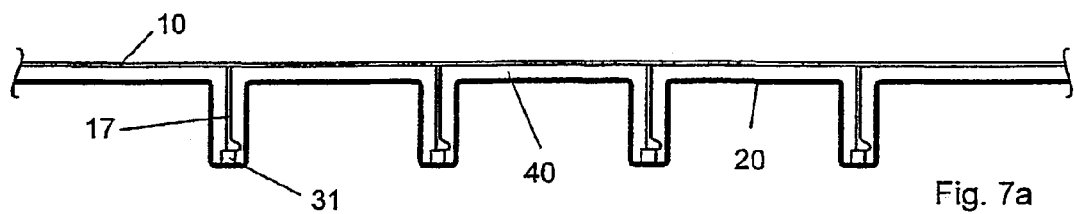
Figure 8:
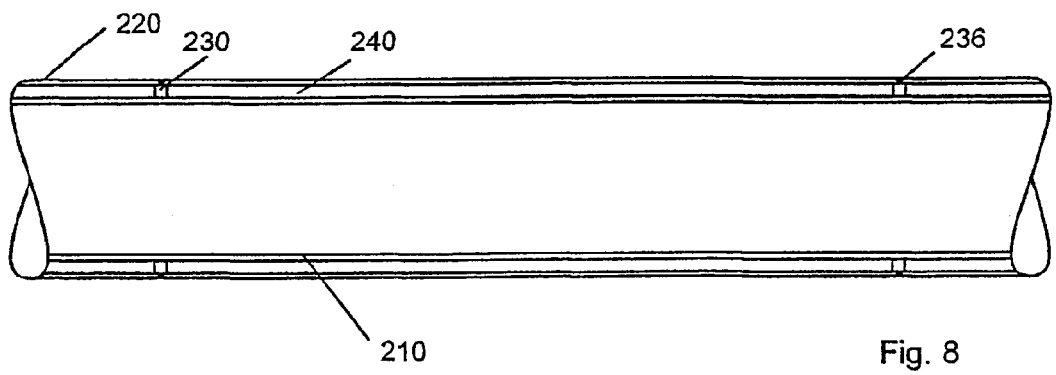
Figure 11:
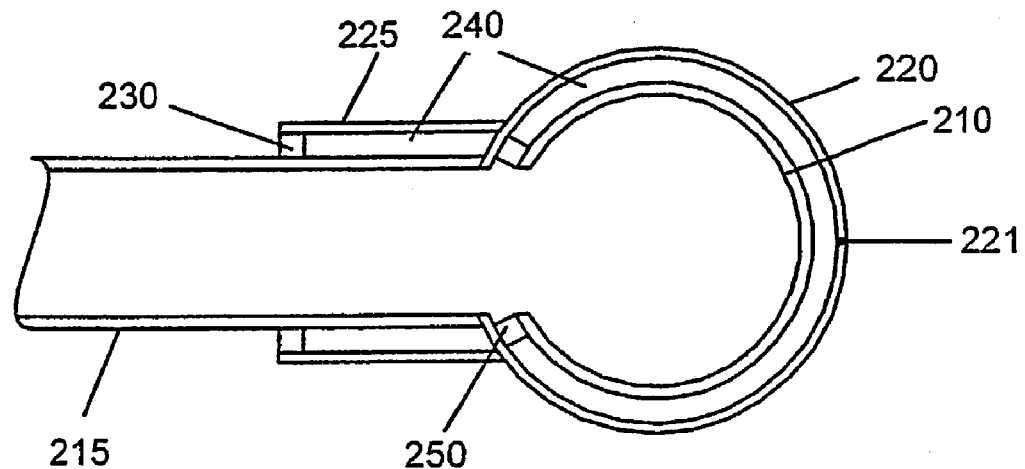
Figure 12:
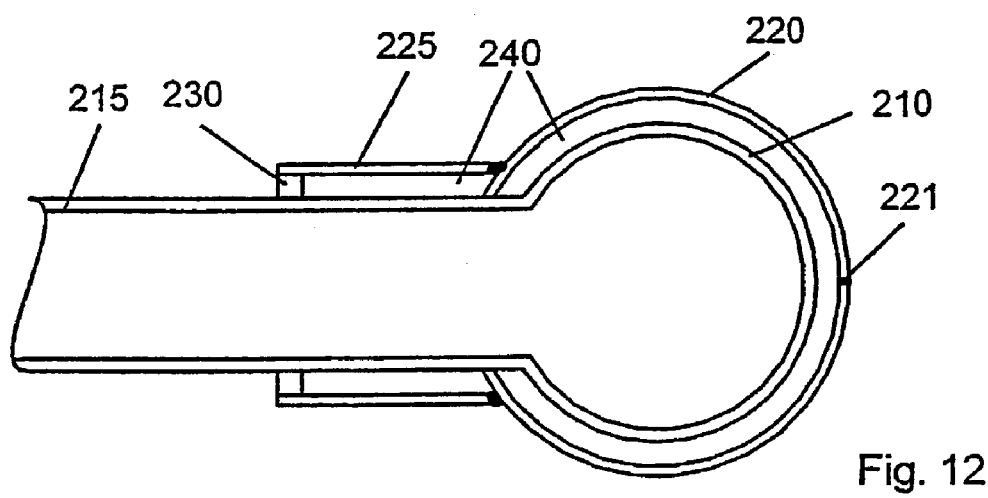

FIGS. 7a, b and c are cross-sectional views of metal panels of existing structures which have been reinforced using a method according to the present invention and in which the reinforcing metal layers surround supporting members (stiffeners) of the metal panels;

FIG. 8 is a cross-sectional view of an existing main pipeline which has been reinforced with multiple casings using a method according to the present invention;

FIGS. 9a and b are cross-sectional views of cavity circumferential end spacer rings with various seals which may be used in a method according to the present invention;

FIG. 10 is a perspective view of existing main and spur pipelines which have been reinforced using a method according to the present invention. The spur pipeline may be existing or newly attached;

FIG. 11 is a cross-sectional view of an existing main pipeline with a spur pipeline attached according to a method of the present invention; and FIG. 12 is a cross-sectional view of an existing main pipeline with a spur pipeline attached using an alternate method according to the present invention.

In the Figures, like parts are identified with like numerals.

Figure 1:
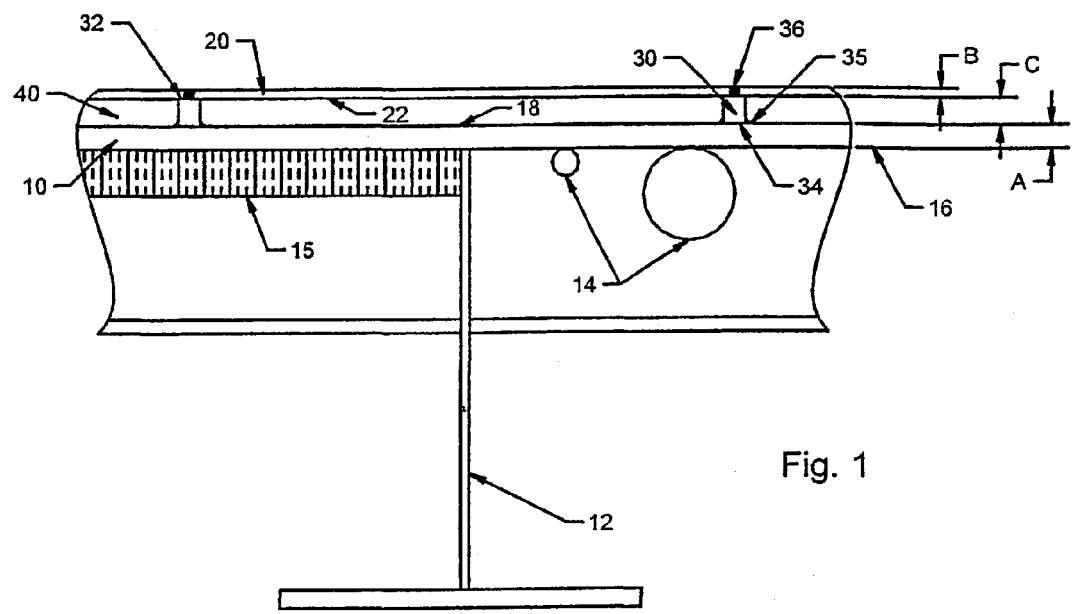
FIG. 1 is a cross-sectional view of a metal panel of an existing structure which has been reinforced above the metal panel using a method according to the present invention.

FIG. 1 is a cross-sectional view of a deck of a Ro-Ro ferry which has been reinforced by the method according to the present invention. A metal panel 10, forming the original deck, is supported by beams 12 and bulb flats 17. Various pipes and cables 14 as well as fire insulation material 15 are attached to the underside 16 of metal panel 10.

The metal panel 10 has an original thickness A which, in a Ro-Ro ferry deck for example, that would be typically in the range between 10 mm and 20 mm. Typically, corrosion and wear reduce the thickness of the metal panel 10 by approximately 0.15 mm per year. Under these conditions the metal panel 10 would need to be replaced or reinforced after approximately twenty years use.

The method of reinforcing of the present invention involves attaching a reinforcing metal layer 20 to the metal panel 10 of the existing structure. The metal layer 20 is arranged to be in spaced apart relation from the metal panel 10 to thereby form a cavity 40 between the metal panel 10 and the reinforcing metal layer 20. An intermediate core layer of uncured plastics material is then injected or cast into the cavity 40. When the plastics material has cured (it may be a self-curing plastics material which needs no action to be cured or for example a plastics material which requires heating to be cured), it adheres to an inner surface 18 of the metal panel 10 and to an inner surface 22 of the reinforcing metal layer 20 with sufficient strength to transfer shear loads between the metal panel 10 and reinforcing layer 20 so as to form a composite structural member capable of bearing loads significantly greater than self-weight. Generally, all welds are completed prior to injecting the plastics material.

In the embodiment shown in FIG. 1, spacers 30 are provided between the metal panel 10 and the reinforcing metal layer 20. The spacers 30 may be of any cross-section or shape but, when attached to the inner surface 18 of the metal panel 10 by the adjacent surface end 34 typically project above the metal panel 10 by the same amount. This distance may vary from cavity to cavity or it may vary within a cavity depending on application. The reinforcing metal layer 20 is then attached to the other end 32 of the spacers 30 to thereby form the cavity 40. In this way the method may also be carried out on deformed or even buckled panels. The reinforcement will provide a smooth surface for the reinforced side. This is particularly ideal for Ro-Ro ferries as it provides a smooth riding surface for the vehicles.

Preferably the spacers 30 are made of metal and in this way they can be welded (using continuous fillet welds 35) to the original metal panel 10 as well as to the reinforcing metal layer 20 using butt welds 36 along natural plate seams. Conveniently the spacers 30 may be used to subdivide the cavity 40 between the metal panel 10 and the reinforcing metal layer 20 into a plurality of smaller cavities of a size to allow casting therein of the plastics material.

Figure 3:
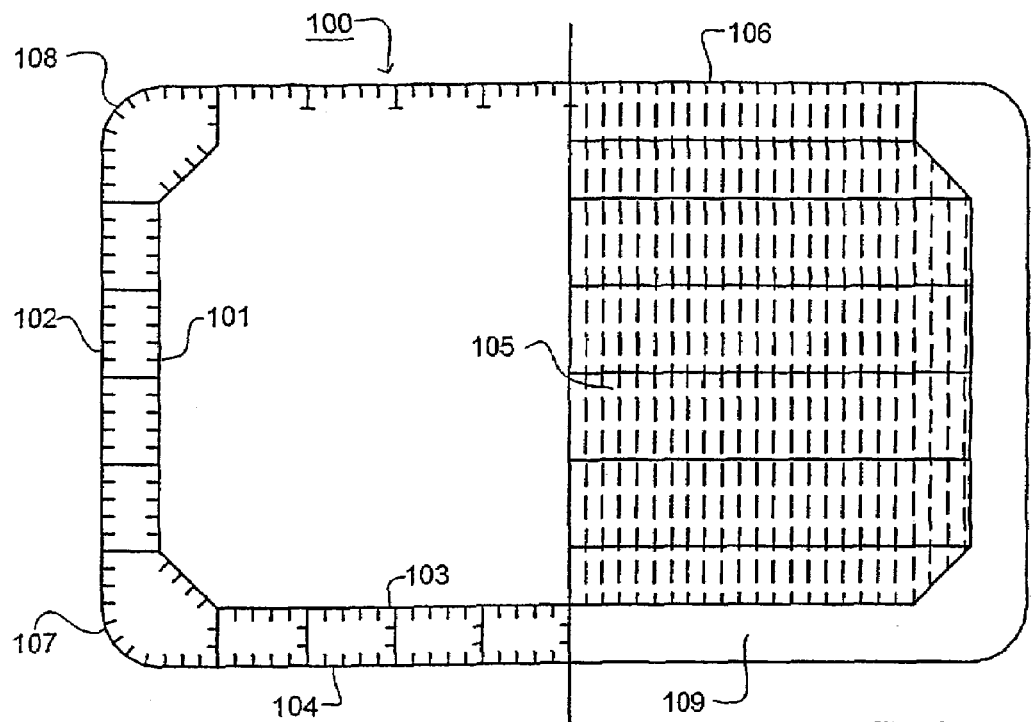
FIG. 3 shows a transverse cross-section of a typical ship to which the present invention may be applied.

The structure of a ship 100 to which the invention may be applied is shown in FIG. 3. This ship is a double-hulled structure with inner and outer side shells 101, 102 and inner and outer bottoms 103, 104. A transverse bulk head 105 is also shown and the deck is shown as 106. The bilge is at 107, the gunwhale 108 and a web frame at 109. The present invention may be applied to any of these parts of the ship and, of course, to other parts and other ships, including single-hulled vessels.

The best way presently known to the applicant to prepare the existing metal panel and to ensure a good bond between the spacers 30 and the existing metal panel 10 is to shot or grit blast the inner surface 18 of the metal panel 10. However, other methods to provide the required surface roughness and a paint and rust free surface suitable for bonding of the plastic materials can be used. Ideally the surface 18 should be free of dirt, dust, oil and water.

The intermediate layer core 40 should preferably have a modulus of elasticity, E, of at least 250 MPa, more preferably 275 MPa, at the maximum expected temperature in the environment in which the reinforcing is to be used. In ship building applications this may be 100° C.

The tear, compression and tensile strengths as well as the elongation should be maximised to enable the reinforced panel to absorb energy in unusual load events, such as impacts. In particular, the compressive and tensile strengths of the plastics material should be optimally at least 2 MPa, and preferably 20 MPa. The compressive and tensile strengths can, of course, be considerably greater than these minima.

The ductility of the plastics material at the lowest operating temperature should be greater than that of the metal panel or metal layers. A preferred value for the ductility of the plastics material at lowest operating temperature is 50%. The thermal coefficient of expansion or contraction of the plastics material must also be sufficiently close to that of the metal panel 10 and metal layer 20 so that temperature variation across the expected operating range, and during welding, does not cause delamination. The extent by which the thermal coefficients of expansion or contraction of the two materials can differ will depend in part on the elasticity of the plastic but it is believed that the thermal expansion coefficient of expansion or contraction of the plastics material may be about ten times that of the metal layers. The coefficient of thermal expansion may be controlled by the addition of fillers to the plastics material.

The bond strength between the plastics material and inner surfaces 18, 22 of the metal panel and layer should be at least 0.5 MPa, preferably 6 MPa, over the entire operating range. This is preferably achieved by the inherent adhesiveness of the plastics material to the metal but additional bond agents may be provided.

Additional requirements if the metal panel 10 is part of a ship hull, (as shown schematically in FIG. 3), include that the tensile bond strength across the interface must be sufficient to withstand expected negative hydrostatic pressure and delaminating forces from metal connections. The plastics material must be hydrolytically stable to both sea and fresh water and if the member is to be used in an oil tanker must have chemical resistance to oils.

Conveniently the plastics material may be an elastomer and the reinforcing metal layer 20 may be a steel, stainless steel, an aluminium alloy or any other typical metal associated with standard construction practice. The elastomer may therefore essentially comprise a polyol (e.g. polyester or polyether) together with an isocyanate or a di-isocyanate, a chain extender and a filler. The filler is provided, as necessary, to reduce the thermal coefficient of the intermediate layer, reduce its cost and otherwise control the physical properties of the elastomer. Further additives, e.g. to alter mechanical properties or other characteristics (e.g. adhesion, water and oil resistance), and fire retardants may also be included.

The size of the injection ports required and their positions will depend on the available equipment for injecting the components of the plastics material and the orientation of the cavity. Generally there is one injection port per cavity. The ports may be located in either the reinforcing layer 20 or the metal panel 10 and should be located to minimize or eliminate splash. The injection ports are ideally quick disconnect ports, possibly with one-way valves, that can be ground off after casting. They may also be sealed with plugs which are ground smooth after casting.

Air vents are placed in each of the plurality of cavities to allow escape of all air in the cavity and to ensure no void space is left. The air vents may be threaded to allow insertion of plugs after filling or include valves or other mechanical devices which close after filling. The air vents and any plug or valve may be ground smooth after the plastics material has cured.

Plugs inserted in injection ports or air vents should be made of a material which has galvanic characteristics compatible with the metal layer 20. If the metal layer 20 is steel the plugs may be of brass. Metal plugs for venting holes or injection ports may be detailed as temperature controlled pressure relief valves as required.

The injection process must be monitored to ensure even filling of the cavity without any back pressure which might cause swelling and uneven plate thickness, and to ensure that the dimensional accuracy (core thickness) is maintained within the specified limits.

After manufacture and during the life of the reinforcement, it may be necessary to verify that the elastomer has correctly adhered to the metal layers. This can be done using sonic, ultrasound or x-ray techniques or by any other suitable calibrated technique.

In this way the metal panel 10 of the existing structure may be reinforced without removal and without detaching the components such as supporting beams 12, pipes or cables 14 and fire insulation material from the underside 18.

Metal or elastomer support members 50 of any given shape with flat parallel end surfaces, may also be placed on or attached to the inner surface 18 of the metal panel 10 between the spacers 30 before the reinforcing metal layer 20 is attached to the spacers 30. These supporting elements 50 support the reinforcing metal layer 20 and ensure dimensional accuracy (elastomer thickness and reinforcing metal layer flatness).

Figure 2:
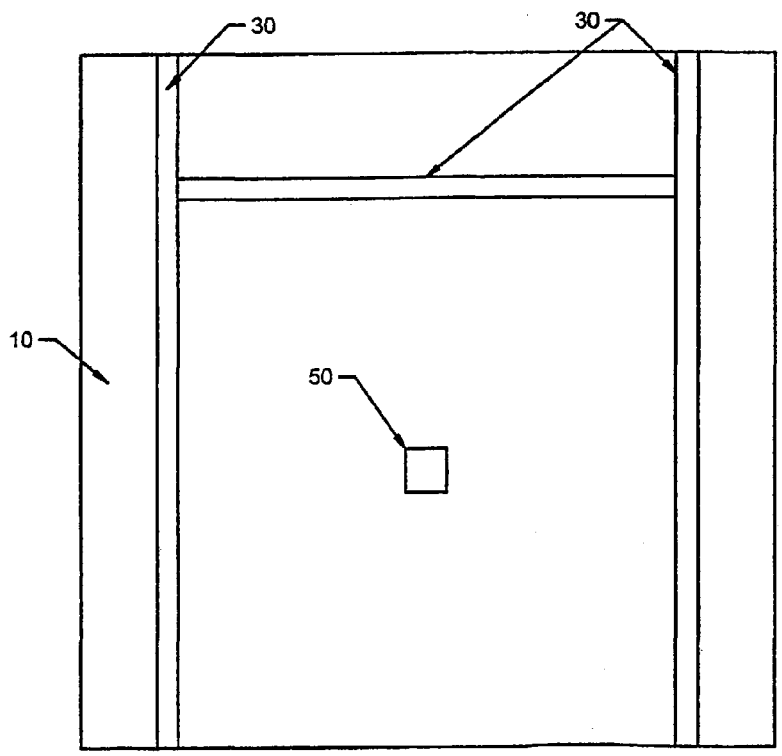
FIG. 2 is a plan view of a metal panel of an existing structure during reinforcing using the method of the present invention.

FIG. 2 shows in plan typical spacers 30 and support elements 50 which can be used in the present invention. Most conveniently the spacers 30 are rectangular in cross-section such that they can easily be joined together to form cavities of a suitable size for injecting elastomer. The flat surface 32 of the spacer 30 provides an ideal landing surface for the reinforcing metal layer 20 and for making butt welds or plate seams 36.

The thickness B of the reinforcing metal layer 20 is preferably more than 1 mm but may be of any thickness that provides the required structural characteristics and facilitates fabrication, handling and welding, such as 6 mm. A thickness of 3 mm provides an additional ten years of use maintaining the deck plate structurally equivalent or better than the existing metal panel 10 by itself. A thickness C of plastics material is optimally between 10 mm and 25 mm but may be thicker depending on the application and structural requirements. For example, for tank tops of bulk carriers, the average core thickness may be 100 mm thick.

A complete deck overlay with dimension B being equal to 3 mm and dimension C being equal to 15 mm with a plan dimension of 140 metres by 19 metres (a typical deck of a Ro-Ro ferry) is equivalent in weight to about one lorry. Such a deck would provide a minimum additional ten years of use for the ferry. Such a reinforced deck has a dead load of approximately 2.5 kN/m$^2$ compared to a dead load of the original decking which is 12.5 mm thick of 2.2 kN/m$^2$.

Figure 4:
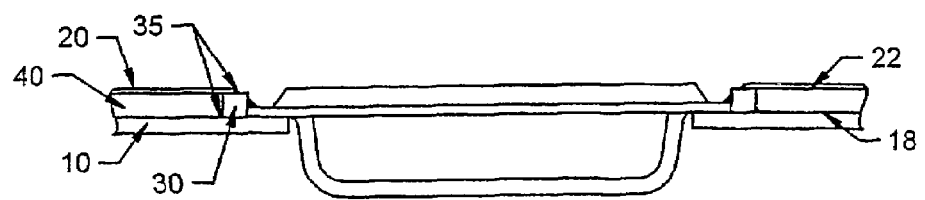
FIG. 4 is a cross-sectional view of a metal panel of an existing structure which has been reinforced using a method according to the present invention and which surrounds a lashing pot.

FIG. 4 illustrates how the method could be applied to a deck surrounding lashing pot. In such a case (and in any circumstance where the existing panel 10 does not abut a metal member at or close to right angles e.g. at hatch covers) a spacer 30 may be utilised to form the side wall between the cavity 40 and the outside of the reinforced structure. Fillet welds 35 can then be used to attach the spacers 30 to the existing panel 10 as well as the lashing pot and to attach the reinforcing layer 20 to the spacer 30.

Figure 5:
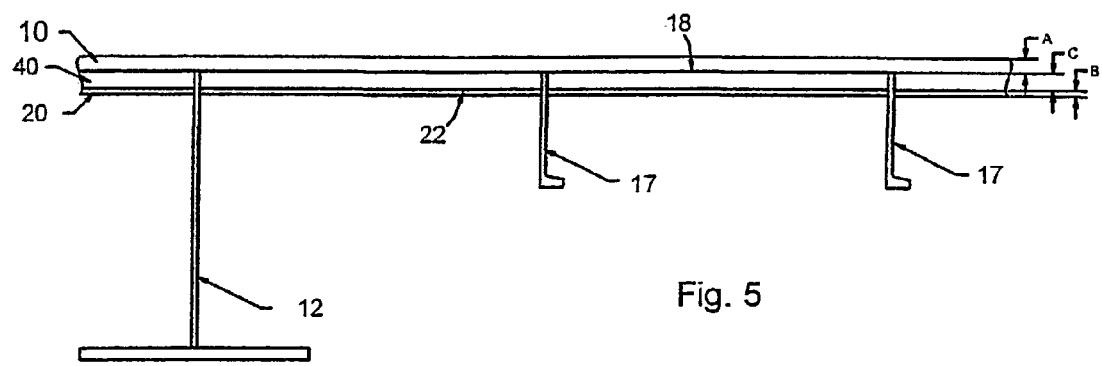
FIG. 5 is a cross-sectional view of a metal panel of an existing structure which has been reinforced within the metal panel using a method according to the present invention.

FIG. 5 shows alternative positioning of the reinforcing layer 20 relative to the existing panel. In the illustrated method, the reinforcing layer is attached, in spaced apart relationship, to the existing stiffened plate panel on the same side as the existing supporting members 12 (for example longitudinal girders and transverse beams) and stiffening members 17. This embodiment allows stiffened hulls and side structures in which the outer plate surface is adjacent to a fluid (sea water, oil etc.) to be reinforced. This same method of reinforcement may be applied to other internally stiffened plates, where applicable, to lengthen the service life or to increase load carrying capacity and impact resistance.

Figure 6:
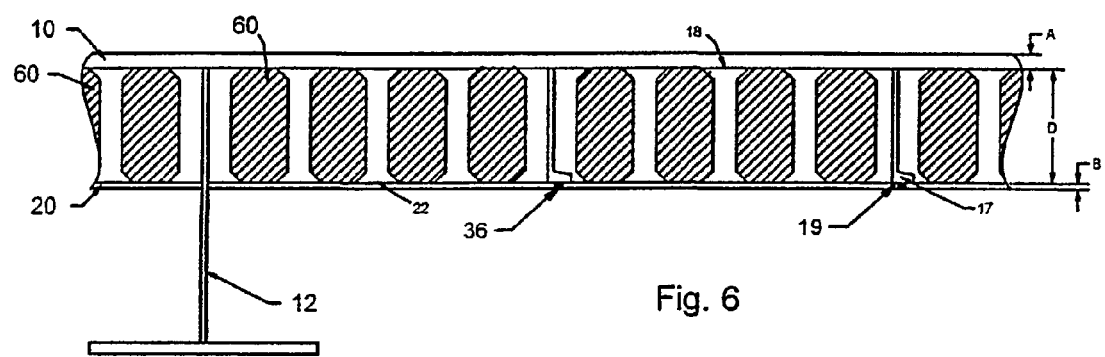
FIG. 6 is a cross-sectional view of a metal panel of an existing structure which has been reinforced within the metal panel using a method according to the present invention, to provide a composite structural laminate.

In the example shown in FIG. 6 the reinforcing panel is welded directly onto an adjacent bottom end 19 of the existing stiffening members 17 using butt welds 36. In such an arrangement, because of the large depth of the cavity, it may be advantageous to place foam forms 60 in the cavities to reduce the overall weight of the reinforcement. Although not explicitly illustrated in FIG. 6, the space or cavity between 10 and 20 may also include services (piping, cables) as disclosed in British Patent Application No. 9926333.7.

Figure 7B:
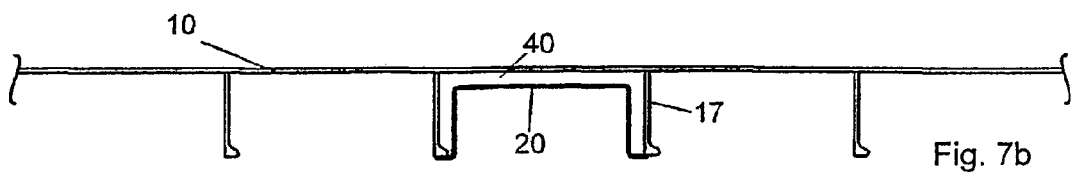
Figure 7C:
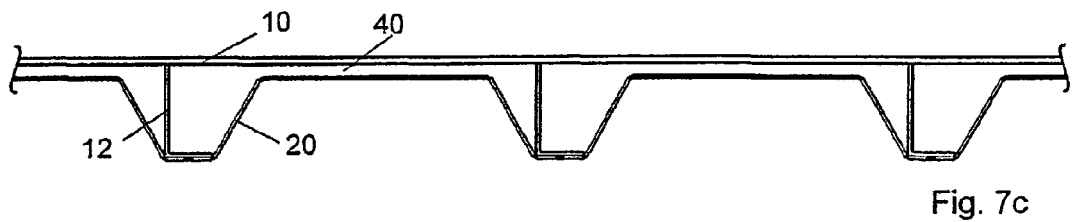

FIG. 7a shows alternative positioning of the reinforcing metal layer 20 relative to the existing structure. In the illustrated embodiment, the reinforcing metal layer 20 is attached, in spaced apart relationship, to the existing stiffened plate panel on the same side as the existing supporting structures 17. The reinforcing layer 20 is bent around the bulb flats such that the bulb flats are positioned between the existing metal panel 10 and the reinforcing metal layer 20. In the embodiment illustrated in FIG. 7a the reinforcing metal layer 20 is welded to spacers 31 which are also welded to a surface of the bulb flats 17 opposite the surface of the bulb flat on which the bulb flat is attached to the metal panel 10. The spacers may be continuous or intermittent to allow uncured plastics material to flow freely around bulb flats 17 or to define cavities of limited volume which include one or more bulb flats. FIG. 7b illustrates an embodiment in which the spacers 31 are not utilised for the attachment of the reinforcing metal panel 20 to the bulb flats 17. The embodiment illustrated in FIG. 7b also shows that plate seams joining reinforcing metal layers 20 are made at each bulb flat along the length of the flange of that bulb flat 17. The embodiment illustrated in FIG. 7c shows the metal layer 20 attached to angle stiffeners or in the limiting case transverse beams or longitudinal girders 12 in a similar way to the attachment of the reinforcing metal layer 20 to the bulb flat 17 illustrated in FIGS. 7a and 7b. In all of the embodiments illustrated in FIG. 7 the reinforcing metal layer 20 is bent such that the metal layer 20 is further from the metal panel 10 in the proximity of the beams 12 or bulb flats 17 than in other positions. The metal layer 20 may be bent in any shape (e.g. curved, flat, etc.) and may be a plurality of panels, for example, one between each bulb flat 17 or may be a continuous sheet. The advantage of the embodiments as illustrated in FIG. 7 is that the reinforcing metal layer 20 simplifies the inner surface making it simpler to apply quality coatings, reduces localised plate bending at the stiffener-plate welded connection, diminishing the probability of fatigue cracking of joining welds and provides additional reinforcement to stabilise or strengthen existing stiffeners which may be damaged or otherwise.

In all embodiments the intermediate layer 40 may be injected through either the metal panel 10 or the reinforcing metal layer 20 at as many locations as required to ensure that the cavities are completely filled.

The embodiments illustrated in FIG. 7 are ideally suited for structures where there are significant numbers of obstacles, like deck fittings, piping, hatches, etc. on the outer surface of the metal panel 10 that would interfere with the application of a metal layer as illustrated in FIG. 1. Furthermore this embodiment can be applied to structures that have suffered stiffener damage (buckling or yielding) from localised overloading.

In yet a further embodiment, existing stiffeners are cut to shorten their length and leave stubs, and the reinforcing layer is attached to the existing panel in spaced apart relationship to the stiffener stubs. In such an arrangement the intermediate layer needs to be thicker to give the required stiffness. This embodiment is useful if the stiffeners have been deformed or damaged or existing welds between the stiffeners and plating have fractured.

In all embodiments, prior to attaching the reinforcing layer, weld cracks in the stiffeners may be repaired and other maintenance work carried out The present invention has been described above in relation to a deck of a Ro-Ro ferry. However the invention is also useful in other applications, especially those where high in-plane and transverse loads are expected, for example slamming loads, or where high rupture strength, high fatigue strength or high resistance to crack propagation is desirable. Examples of such structures are tunnel linings, orthotropic bridge decks, cargo holds, tank tops of bulk carriers, hulls, external ship structures, off-shore structures, especially helicopters, stadium roofs, and containment vessels.

An example of a further application of the present invention is illustrated schematically in FIG. 8 which is of a cross-section through an existing main pipeline 210 which has been reinforced or reinstated or rehabilitated using the method of the present invention. In this specific embodiment, circumferential end or intermediate ring spacers 230 are provided in sealed contact against the outer surface of the main pipeline 210 and a reinforcing layer (pipe casing) 220 is attached in spaced apart relationship from the pipe 210 to the rings 230. In this way a cavity which can be filled with an intermediate layer 240 is formed between the reinforcing layer 220 and the existing pipe 210. The reinforcing layer 220 can be made up of a plurality of sections, for example two sections with a semicircular cross-section which are welded to an outer surface of the ring 230 (opposite the inner surface which is in contact with the pipe 210) and to each other using longitudinal welds 221 as illustrated in FIG. 10. Of course any number of sections may be used to make up the reinforcing layer 220.

To avoid direct welding to the existing main pipeline 210, which could lead to burning through or rupture of the existing pipe wall, full penetration groove welds 236 are only made between the reinforcing layer sections 220 and the rings 230 or between reinforcing layer sections 220.

The circumferential end or intermediate ring spacers 230 are generally of the same material as the reinforcing layer sections 220 or of a weld compatible material. In one embodiment of the invention, two semi-circular reinforcing layer sections 220 with semi-circular end ring spacers 230 already attached on their mating surfaces, are brought together around the existing pipeline 210 (for example clamped in place) and two longitudinal weld seams 221 are made. In this way a complete reinforcing layer 220 is formed around the existing pipeline 210 with spacers between the reinforcing layer 220 and the existing pipeline 210. Circumferential weld shrinkage along the weld seams 221 draws the reinforcing layer tighter around the existing pipeline providing a tighter connection (seal) between the spacers 230 and the existing pipeline 210 to form an airtight annular cavity.

Two or more reinforcing layer sections 220 with quarter circle cross-sections or with cross-sections of other fractions of a circle may be used to form a complete reinforcing layer 220. The reinforcing layer 200 need not exactly match the shape of the existing pipeline.

In FIG. 9a an O-ring gasket 235 is illustrated on the inner surface of the ring 230. In FIG. 9b a flat gasket 237 is illustrated on the inner surface of the ring 235. The o-ring 235 or flat gasket 237 provided on the inner surface of the spacer ring 230 provide a contact seal with the outside of the existing pipe when in place. Alternatively the gaskets 235, 237 may be replaced by adhesive which seals around the existing pipeline.

In this method, the reinforcing metal layer 220 provides the necessary hoop strength for internal pressure of fluid in the pipe and the intermediate layer 240 a corrosion protection layer to the existing pipeline that also acts an effective seal.

FIG. 10 illustrates an existing main pipeline 210 with a spur pipeline 215 that was reinforced using the method of the present invention. A first reinforcing metal layer 220 is provided around the outside of the existing pipe 210 and a second reinforcing metal layer 225 is provided around the spur pipeline 215. In the embodiment illustrated in FIG. 10 both the first reinforcing metal layer 220 and the second reinforcing metal layer 225 are provided by two sections of semicircular cross-section joined along welding line 221 with a full penetration groove weld. The ends of the reinforced section on both the main 210 and spur 215 pipelines are fitted with end ring spacers 230 which provide air tight cavities between the reinforcement and the existing pipelines 220 and 210, and 225 and 215 respectively. Sealing details are similar to those described in FIGS. 9a and 9b. Plastics material (elastomer) is injected into the cavities to provide a composite pipeline connection.

Two embodiments of a method of adding a spur pipeline 215 to an existing main pipeline 210 are illustrated in FIGS. 11 and 12. In FIG. 11 the first reinforcing metal layer 220, which is comprised of two sections of semi-circular cross-section, with semi-circular end ring spacers 230 attached, is positioned around the existing main pipeline 210 and welded along longitudinal seams 221, as is shown in FIG. 10. A circular ring spacer 250 is positioned around a through hole (for the spur pipeline) in the first reinforcing layer wall and between the existing pipeline 210 and the first reinforcing layer 220. The circular ring spacer has curved upper and lower surfaces for good contact with the fist reinforcing layer 220 and the existing main pipeline 210. Weld shrinkage in the circumferential direction draws the reinforcement tight enhancing the seal along all spacers.

The spur pipeline 215 is welded to the first reinforcing metal layer 220 such that its bore aligns with the through-hole and is substantially perpendicular to the axis of the existing or main pipeline 210. The second reinforcing metal layer 225, which is comprised of two sections of semi-circular cross-section with one end ring spacer 230, are placed around the spur pipeline 215 and welded along the seams and to the first reinforcing layer 220 with a full penetration rove weld. Airtight cavities between the first reinforcing layer 220 and the existing main pipeline 210 and between the second reinforcing layer 225 and the spur pipeline 215 are injected with plastics material 240 which is allowed to cure to form a composite pipeline connection. Next, valves, joins and boring equipment are attached to the free end of the spur pipeline. The original main pipeline wall is then bored using existing technology, allowing the contents of the main pipeline to pass freely into the spur pipeline, i.e. the bores of the spur and main pipelines come into contact.

The second embodiment of the method of adding a spur pipeline according to the present invention is illustrated in FIG. 12. In this embodiment the spur pipeline 215 is welded (simple fillet welds of sufficient capacity and size to provide a seal for the purpose of injecting plastics material) directly to the existing pipeline 210 before the first reinforcing metal layer 220 and then the second reinforcing metal layer 225 are attached as described in the previous embodiment. This method has the advantage that the seal 250 is not required. Welding directly to the existing pipeline is not considered to be a disadvantage as the welds are small and not structurally critical. The remaining steps for completing the composite pipeline connection are as previously described.

The first and second reinforcing metal layers 220, 225 and the intermediate layer 240 provide the T-joints with excellent strength and stiffness. The thickness of the reinforcing layers and intermediate layers are chosen to give the required structural characteristics. The intermediate layer 240 effectively protects the existing pipeline against corrosion and provides a seal against leaks. The composite pipeline connection is robust and ductile. It is capable of sustaining substantial impact loads and relative displacements due to ground subsidence.

The invention claimed is:

1. A method of reinforcing a panel that has been reduced in thickness in use and is part of an existing metal structure comprising the steps of:
   providing a reinforcing metal layer in spaced apart relation to said panel to form at least one cavity between said panel and said reinforcing metal layer;
   injecting an intermediate layer comprised of an uncured plastics material into said at least one cavity; and
   curing said plastics material so that it adheres to said panel and said reinforcing metal layer with sufficient shear strength to transfer shear forces between said panel and said reinforcing metal layer such that said panel, said reinforcing metal layer and said intermediate layer act mechanically together as a composite structural member,
   wherein supporting members are arranged in said at least one cavity in contact with said panel and said reinforcing metal layer, and
   wherein said step of providing a reinforcing metal layer comprises the steps of: adhering at least one spacer to said panel, and adhering said reinforcing metal layer to said at least one spacer, and
   wherein said at least one spacer is metallic and said steps of adhering comprise welding.

2. The method of claim 1, wherein said panel is part of a tunnel lining, a bridge deck, a cargo hold, a ship deck, a bulkhead, an external ship structure, a containment vessel, a building structure, a ship hull, or an off-shore structure or a smaller metal part of such an existing structure.

3. A method according to claim 1, wherein said at least one spacer is a plate spacer, a spacer made of plastic, a lashing pot collar or a backing bar.

4. A method according to claim 1, wherein before said providing step said panel is shot- or grit-blasted and cleaned.

5. A method according to claim 1, wherein said reinforcing metal layer is less than 20 mm thick.

6. A method according to claim 1, wherein said intermediate layer is at least 10 mm thick.

7. A method according to claim 1, wherein said plastics material is an elastomer.

8. A method according to claim 1, wherein said existing metal structure is part of a larger existing structure.

9. A method according to claim 1, wherein said panel is supported by beams, girders or bulb flats and said reinforcing metal layer is arranged such that said beams, girders or bulb flats are positioned between said panel and said reinforcing metal layer.

10. A method according to claim 9, wherein said reinforcing metal layer is bent such that said reinforcing metal layer is further from said panel in the proximity of said beams or bulb flats than in other positions.

11. A method according to claim 10, wherein said reinforcing metal layer is attached to said beams or bulb flats on a surface opposite a surface on which said beams or bulb flats are attached to said panel.

12. A method according to claim 11 wherein said reinforcing metal layer is attached to said beams or bulb flats via a spacer.

13. A method according to claim 9, wherein said reinforcing metal layer is attached to said beams or bulb flats on a surface opposite a surface on which said beams or bulb flats are attached to said panel.

14. The method of claim 1, wherein said plastics material is such that, when cured, it provides inherent damping and sound insulation.

15. The method of claim 1, wherein said plastics material, when cured, adheres to said panel and said reinforcing metal layer with a bond strength of at least 0.5 MPa.

16. The method of claim 1, wherein said plastics material, when cured, adheres to said panel and said reinforcing metal layer with a bond strength of at least 6 MPa.

17. The method of claim 1, wherein the tear, compression and tensile strengths as well as the elongation of the intermediate layer are such as to enable the composite structural member to absorb energy in unusual load events, such as impacts.

18. The method of claim 1, wherein said plastics material, when cured, has a modulus of elasticity of at least 250 MPa.

19. The method of claim 1, wherein said plastics material, when cured, has a modulus of elasticity of at least 275 MPa.

20. The method of claim 1, wherein said plastics material, when cured, has a tensile strength of at least 2 MPa.

21. The method of claim 1, wherein said plastics material, when cured, has a tensile strength of at least 20 MPa.

22. The method of claim 1, wherein said plastics material, when cured, has a shear modulus of at least 92 MPa.

23. The method of claim 1, wherein said plastics material, when cured, has a ductility at the lowest operating temperature greater than that of said panel or reinforcing layer.

24. The method of claim 1, wherein said plastics material, when cured, has a coefficient of thermal expansion such as not to cause de-lamination from said panel or reinforcing layer during temperature fluctuations in use or during welding.

25. The method of claim 1, wherein said panel is a part of a ship hull and said plastics material, when cured, has a tensile bond strength to said panel and said reinforcing layer high enough to withstand negative hydrostatic pressure and de-laminating forces from metal connections.

26. The method of claim 1, wherein said plastics material, when cured is hydrostatically stable to both sea and fresh water and/or has a chemical resistance to oils.

27. The method of claim 1, wherein said plastics material, when cured, has a compressive strength sufficient to maintain structural integrity under impact.

28. A method of reinforcing a panel that has been reduced in thickness in use and is part of an existing metal structure comprising the steps of:
   providing a reinforcing metal layer in spaced apart relation to said panel to form at least one cavity between said panel and said reinforcing metal layer;
   injecting an intermediate layer comprised of an uncured plastics material into said at least one cavity;
   curing said plastics material so that it adheres to said panel and said reinforcing metal layer with sufficient shear strength to transfer shear forces between said panel and said reinforcing metal layer such that said panel, said reinforcing metal layer and said intermediate layer act mechanically together as a composite structural member,
   wherein said panel is supported by beams, girders or bulb flats and said reinforcing metal layer is arranged such that said beams, girders or bulb flats are positioned between said panel and said reinforcing metal layer;
   wherein said reinforcing metal layer is attached to said beams or bulb flats on a surface opposite a surface on which said beams or bulb flats are attached to said panel; and
   wherein said reinforcing metal layer is attached to said beams or bulb flats via a spacer.

* * * * *